(12) United States Patent
Lee et al.

(10) Patent No.: US 10,254,885 B2
(45) Date of Patent: Apr. 9, 2019

(54) DISPLAY DEVICE

(71) Applicant: Samsung Display Co., Ltd., Yongin-si, Gyeonggi-Do (KR)

(72) Inventors: Jong-Soo Lee, Asan-si (KR); Yong-Jun Park, Yongin-si (KR); Jin Seo, Osan-si (KR); Sang-Heon Ye, Cheonan-si (KR); Young-Suk Lee, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 91 days.

(21) Appl. No.: 15/393,895

(22) Filed: Dec. 29, 2016

(65) Prior Publication Data

US 2017/0185220 A1 Jun. 29, 2017

(30) Foreign Application Priority Data

Dec. 29, 2015 (KR) .................. 10-2015-0188387

(51) Int. Cl.
*G06F 3/047* (2006.01)
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01)

(58) Field of Classification Search
CPC combination set(s) only.
See application file for complete search history.

(56) References Cited

U.S. PATENT DOCUMENTS

| 2010/0182273 A1 | 7/2010 | Noguchi et al. |
| 2012/0075238 A1 | 3/2012 | Minami et al. |
| 2014/0043288 A1* | 2/2014 | Kurasawa ............. G06F 3/0412 345/174 |
| 2014/0253493 A1* | 9/2014 | Cho ....................... G06F 3/0412 345/174 |

FOREIGN PATENT DOCUMENTS

KR 10-2014-0141448 A 12/2014
KR 10-2015-0063768 A 6/2015

* cited by examiner

*Primary Examiner* — Van N Chow
(74) *Attorney, Agent, or Firm* — Innovation Counsel LLP

(57) ABSTRACT

A display device includes a pixel including a first electrode and a second electrode and having first capacitance formed between the first electrode and the second electrode; a power supply to provide the first electrode with a third power voltage including an alternating wave form and to provide the second electrode with a second power voltage; and a sensor to sense a touch current flowing between the first electrode and the second electrode in response to the touch driving signal.

14 Claims, 5 Drawing Sheets

DISPLAY DEVICE

CROSS-REFERENCE TO RELATED APPLICATION(S)

This application claims priority under 35 USC § 119 to Korean Patent Application No. 10-2015-0188387, filed on Dec. 29, 2015 in the Korean Intellectual Property Office (KIPO), the contents of which are incorporated herein in its entirety by reference.

BACKGROUND

1. Technical Field

Example embodiments relate to a display device. More particularly, embodiments of the present inventive concept relate to a display device to detecting a touch input.

2. Description of the Related Art

A display device includes a display panel displaying an image and a touch panel (e.g., a conductive touch sensor) which is independent to the display panel. The display device detects a touch input of a user using the touch panel.

An on-cell technique is suggested to manufacture the display device by attach the touch panel to an external surface of the display device. However, a manufacturing process of the touch panel is needed such that a manufacturing time and a manufacturing cost increase. In addition, a thickness of the display device increases due to the display panel.

SUMMARY

Some example embodiments provide a display device of which manufacturing process time and manufacturing cost is reduced and which is a relatively thin.

According to example embodiments, a display device may include a pixel including a first electrode and a second electrode the pixel having first capacitance formed between the first electrode and the second electrode; a power supply configured to provide the first electrode with a third power voltage including an alternating wave form and to provide the second electrode with a second power voltage; and a sensor configured to sense a touch current flowing between the first electrode and the second electrode in response to the touch driving signal.

In an example embodiment, the third power voltage may include a touch driving signal and a first power voltage, the first electrode may form touch capacitance between a touch input object and the first electrode, and the touch input object may approach from an outside of the display device to the first electrode.

In an example embodiment, the touch driving signal may have a square waveform and amplitude which is less than the first power voltage, and the first power voltage may have a constant voltage level.

In an example embodiment, the third power voltage may have a waveform of sum of the first power voltage and the touch driving signal.

In an example embodiment, the third power voltage may be smoothed by the first capacitance.

In an example embodiment, the touch current may decrease according to an approach of the touch input object.

In an example embodiment, the sensor may detect a touch input of the touch input object based on a change of the touch current.

In an example embodiment, the pixel may further include a switching transistor electrically connected between a data line and a third node and transferring a data signal from the data line to the third node in response a scan signal; a storage capacitor electrically connected between the third node and a fourth node and storing the data signal; a light emission element electrically connected between the fourth node and the second electrode; and a driving transistor electrically connected between the first electrode and the fourth node and transferring a driving current to the light emission element based on a third voltage at the third node.

In an example embodiment, the pixel may further include a third transistor electrically connected between the first electrode and the switching transistor and forming a flowing path of the driving current in response to a light emission control signal.

In an example embodiment, the power supply may include a power voltage generating block which generates the first power voltage and the second power voltage; a touch driving signal generating block which generates the touch driving signal; and a summing block which outputs the third power voltage by summing the first power voltage and the touch driving signal.

According to example embodiments, a display device may include a pixel including a first electrode and a second electrode, the pixel having first capacitance between the first electrode and the second electrode; a power supply configured to generate a first power voltage, a second power voltage, and a third power voltage, to alternately provide the first electrode with the first power voltage and the third power voltage, and to provide the second electrode with the second power voltage, the third power voltage including an alternative wave form; and a sensor configured to sense a touch current flowing between the first electrode and the second electrode in response to the touch driving signal.

In an example embodiment, the third power voltage may include the first power voltage and a touch driving signal, the first electrode may form touch capacitance between a touch input object and the first electrode, and the touch input object may approach from an outside of the display device to the first electrode.

In an example embodiment, the touch driving signal may have a square waveform and amplitude which is less than the first power voltage, and the first power voltage may have a constant voltage level.

In an example embodiment, the third power voltage may have a waveform of sum of the first power voltage and the touch driving signal.

In an example embodiment, the touch current may decrease according to an approach of the touch input object.

In an example embodiment, the sensor may detect a touch input of the touch input object based on a change of the touch current.

In an example embodiment, the pixel may further include a switching transistor electrically connected between a data line and a third node and transferring a data signal from the data line to the third node in response a scan signal; a storage capacitor electrically connected between the third node and a fourth node and storing the data signal; a light emission element electrically connected between the fourth node and the second electrode; and a driving transistor electrically connected between the first electrode and the fourth node and transferring a driving current to the light emission element based on a third voltage at the third node.

In an example embodiment, the pixel may further include a third transistor electrically connected between the first electrode and the switching transistor and forming a flowing path of the driving current in response to a light emission control signal.

In an example embodiment, the power supply may provide the third power voltage to the first electrode in a data writing period and may provide the first power voltage to the first electrode in a light emission period. Here, the pixel may store the data signal in the data writing period and may emit light based on the data signal in the light emission period.

In an example embodiment, the third power voltage may include the first power voltage and a touch driving signal, and the power supply may include a power voltage generating block which generates the first power voltage and the second power voltage; a touch driving signal generating block which generates the touch driving signal; and a summing block which outputs the third power voltage by summing the first power voltage and the touch driving signal.

Therefore, a display device according to example embodiments may require no touch panel (or no touch sensor) by using driving electrode of a pixel as a touch sensing electrode. That is, the display device includes a display panel having a touch sensor in-cell type pixel such that a thickness of the display device decreases.

In addition, a manufacturing process time of the display device may be reduced by including a touch sensor in-cell type pixel.

BRIEF DESCRIPTION OF THE DRAWINGS

Illustrative, non-limiting example embodiments will be more clearly understood from the following detailed description taken in conjunction with the accompanying drawings.

DESCRIPTION OF EMBODIMENTS

Hereinafter, the present inventive concept will be explained in detail with reference to the accompanying drawings.

Figure 1:
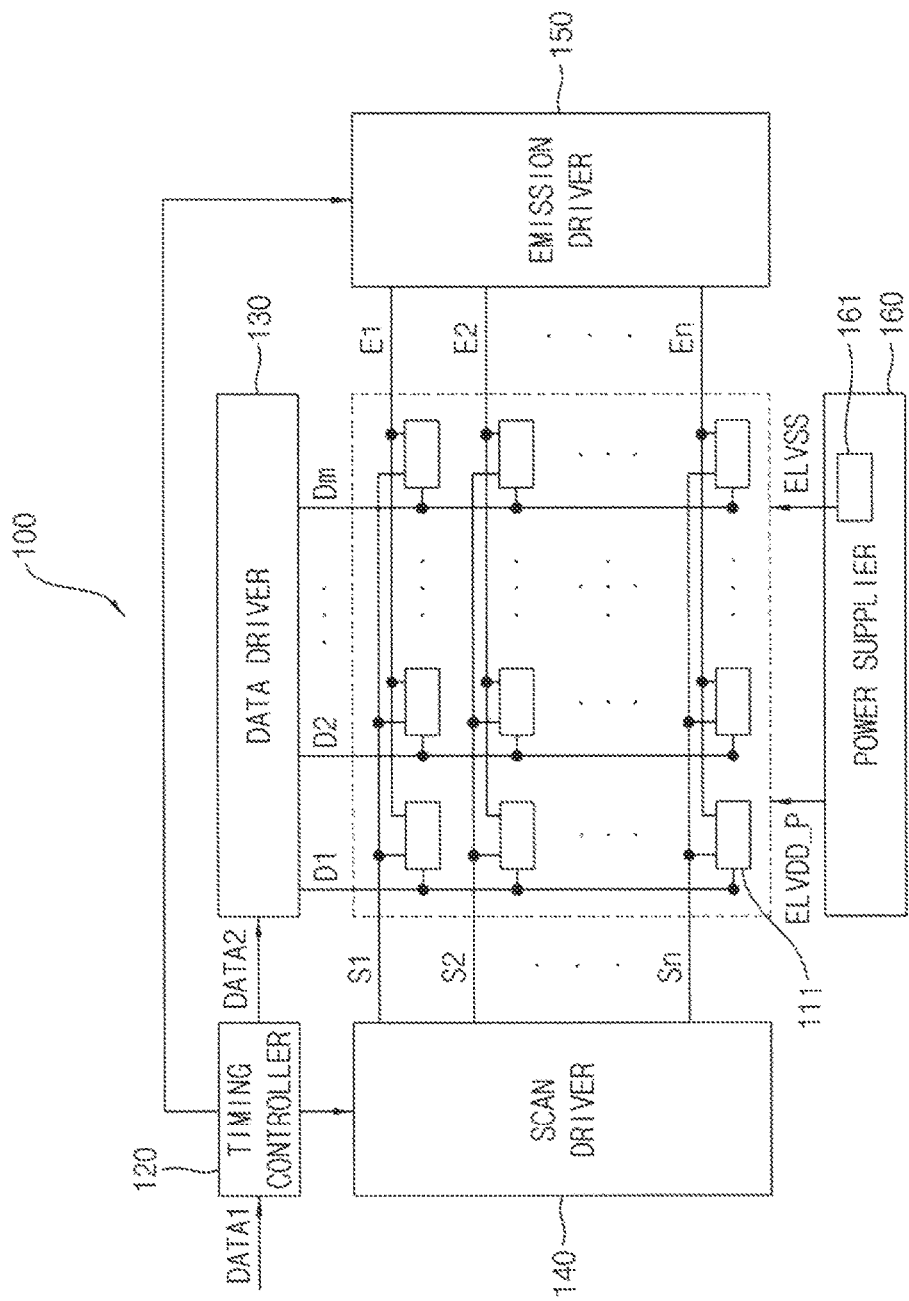
FIG. 1 is a block diagram illustrating a display device according to example embodiments.

FIG. 1 is a block diagram illustrating a display device according to example embodiments.

Referring to FIG. 1, the display device 100 may include a display panel 110, a timing controller 120, a data driver 130, a gate driver 140, and a power supply 160. The display device 100 may further include an emission driver 150. The display device 100 may display an image based on input data DATA1 provided from an external component. For example, the display device 100 may be an organic light emitting display device.

The display panel 110 may include gate lines S1 through Sn, data lines D1 through Dm, light emission control lines E1 through En, and pixels 111, where each of n and m is an integer greater than or equal to 2. The pixels 111 may be located in cross-regions of the gate lines S1 through Sn, the data lines D1 through Dm, and the light emission control lines E1 through En.

In some example embodiments, the pixel 111 may include a first electrode and a second electrode, may have first capacitance formed between the first electrode and the second electrode, and may receive a touch driving signal through the first electrode. Here, the first electrode may receive a first power voltage ELVDD, the second electrode may receive a second power voltage ELVSS, the touch driving signal may be a pulse (or a square) wave. A total capacitance between the first electrode and the second electrode may be changed according to a touch input which is provided to the display panel 110 (or the display device 100). The display device 100 may sense (or detect) the touch input based on a change of the total capacitance. A configuration of the pixels 111 and a touch sensing function of the pixels 111 will be described in detail with reference to FIGS. 2 through 4.

The data driver 130 may generate a data signal based on second data DATA2. The data driver 130 may provide the data signal to the display panel 110 in response to a data driving control signal.

The gate driver 140 (or a scan driver) may generate a gate signal based on a gate driving control signal. The gate driving control signal may include a start signal (or a start pulse) and clock signals, and the gate driver 140 may include gate driving units (or shift registers) sequentially generating the gate signal based on the start signal and clock signals.

The emission driver 150 may generate a light emission control signal based on a light emission driving control signal and may provide the light emission control signal to the pixels 111 through the light emission control lines E1 through En. The emission driver 150 may determine a light emission time or a light non-emission time (or an off-duty ratio) of the pixels 111 based on the light emission driving control signal. The pixels 111 may emit lights in response to the light emission control signal having a logic low level (or a low voltage, a low voltage level, a turn-on level).

The timing controller 120 may control the data driver 130, the gate driver 140, and the emission driver 150. The timing controller 120 may generate and provide the clock signals and the start signal (or the start pulse) to the gate driver 140. The timing controller 120 may generate the data driving control signal and may provide the data driving control signal and the second data DATA2 by processing the input data DATA1. The timing controller 120 may generate and provide the light emission driving control signal to the emission driver 150.

The power supply 160 may generate driving voltages to drive the display device 100. The driving voltages may include the first power voltage ELVDD and the second power voltage ELVSS. The first power voltage ELVDD may be greater than the second power voltage ELVSS.

In some example embodiment, the power supply 160 may generate a third power voltage. The third power voltage may include the first power voltage and a touch driving signal. For example, the power supply 160 may generate the first power voltage ELVDD and the touch driving signal and may output sum of the first power voltage ELVDD and the touch driving signal. Here, the pixels 111 may receive the third power voltage through the first electrode and may perform the touch sensing function based on the touch driving signal included in the third power voltage.

In some example embodiments, the power supply 160 may include sensor 161. The sensor 161 may sense the total capacitance between the first electrode and the second electrode of the pixels 111. The sensor 161 may calculate a location (or a position), at which the touch input is applied, based on the total capacitance. Alternatively, calculation of the touch location may be performed by the timing controller 120.

As described above, the display device 100 may perform the touch sensing function without a touch panel by using driving electrodes (e.g., the first and second electrodes) of a pixel as the touch sensing electrodes. Therefore, the display device 100 may reduce a manufacturing process time (or eliminate a process of manufacturing the display panel) and may reduce a thickness of the display device 100 (or the display panel 110).

Figure 2:
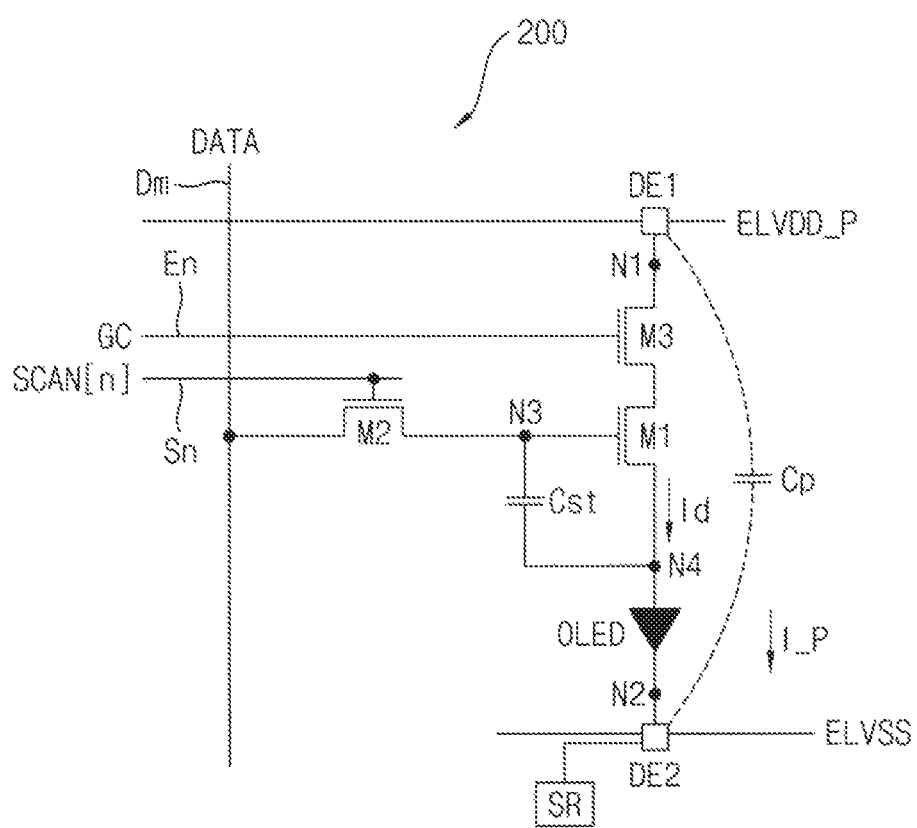
FIG. 2 is a diagram illustrating an example of a pixel included in the display device.

FIG. 2 is a diagram illustrating an example of a pixel included in the display device.

Referring to FIG. 2, a pixel 200 may include a first electrode DE1 (or a first driving electrode), a second electrode DE2 (or a second driving electrode), a first transistor M1, a second transistor M2, a third transistor M3, a storage capacitor Cst, and a light emission element OLED. A first capacitance may be formed between the first electrode DE1 and the second electrode DE2. The first capacitance may be a capacitor component of the pixel 200. For example, the pixel 200 may include a dielectric substance between the first electrode DE1 and the second electrode DE2 or may include a capacitor corresponding to the first capacitance. Hereinafter, for convenience of explanation of the first capacitance, the first capacitance is represented by a first capacitor Cp corresponding thereto.

The first electrode DE1 may receive the third power voltage ELVDD_P, and the second electrode DE2 may receive the second voltage ELVSS.

The second transistor M2 may be electrically connected between a data line and a third node N3 and may transfer a data signal DATA to the third node N3 in response to a scan signal SCAN[n].

The storage capacitor Cst may be electrically connected between the third node N3 and a fourth node N4 and may store the data signal DATA temporally.

The first transistor M1 may be electrically connected between a third power voltage ELVDD_P (or the first electrode DE1) and the fourth node N4 and may be turned on/off in response to a third node voltage at the third node N3, where the third power voltage ELVDD_P is the same as a sum of the first power voltage ELVDD and the touch driving signal.

The third transistor M3 may be electrically connected between the third power voltage ELVDD_P and the third transistor M1 and may be turned on/off in response to a gate signal GC. Here, the gate signal GC may be the light emission control signal.

The third transistor M3 may be turned on by the gate signal GC having the logic low level (or a low voltage, a low voltage level, a turn-on voltage), and the first transistor M1 may transfer a driving current Id to the light emission element OLED in response to the data signal DATA stored in the storage capacitor Cst.

The light emission element OLED may be electrically connected between the fourth node N4 and the second power voltage ELVSS (or a second electrode receiving the second power voltage ELVSS) and may emit lights in response to the driving current Id.

The first capacitor Cp may smooth the third power voltage ELVDD_P. For example, similar to an operation of a capacitor of a conventional smoothing circuit including a diode and the capacitor, the first capacitor Cp may be relatively charged when the third power voltage ELVDD_P is greater than the first power voltage ELVDD, and the first capacitor Cp may be relatively discharged when the third power voltage ELVDD_P is lower than the first power voltage ELVDD. Therefore, a waveform of a smoothed third power voltage ELVDD_P may be substantially the same as or similar to a waveform of the first power voltage ELVDD. In addition, the first capacitor Cp may form a current flowing path of a touch current which occurs due to the touch driving signal Vdrv (or a high frequency component of the third power voltage ELVDD_P).

That is, when the third power voltage ELVDD_P (e.g., the third power voltage ELVDD_P including a direct current (DC) component and an alternative current (AC) component) is provided to the first electrode DE1 of the pixel 200, the pixel 200 may smooth the third power voltage ELVDD_P, may provide a smoothed third power voltage to a current flowing path of the driving current Id, and may form a current flowing path of a touch current I_P due to an AC component (e.g., the touch driving signal Vdrv) of the third power voltage ELVDD_P. Therefore, the pixels 111 may emit light according to the driving current Id, and the display device 100 may sense the touch input based on a change of the touch current I_P (or a change of the total capacitance between the first and second electrodes DE1 and DE2).

In example embodiments, the pixel 200 (or a pixel column, a pixel row) may further include a sensor SR electrically connected to the second electrode DE2. The second SR may sense the touch current I_P by employing a conventional current sensing technique (e.g., a technique integrating a current using an amplifier and a capacitor, or a technique sensing a voltage across a resistor). For example, when the gate signal GC has the logic high level, the third transistor M3 may be turned off, and only the touch current I_P may flow through the first capacitor Cp between the first electrode DE1 and the second electrode DE2. Therefore, the second SR may sense the touch current I_P.

Figure 3:
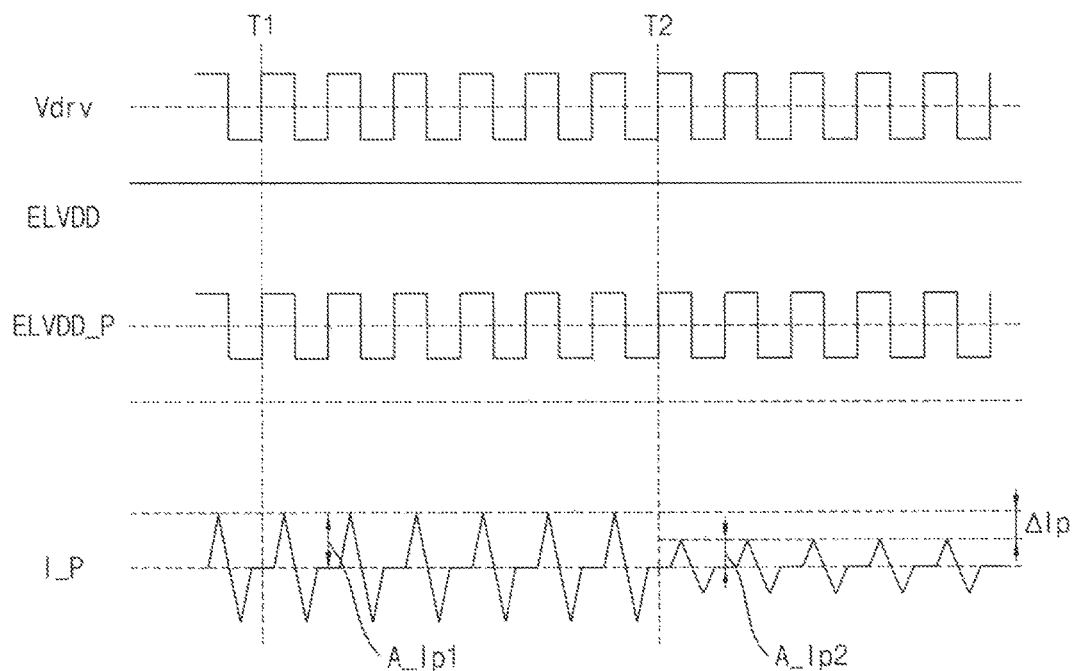
FIG. 3 is a waveform diagram illustrating an example of signals measured at the pixel of FIG. 2.
Figure 4:
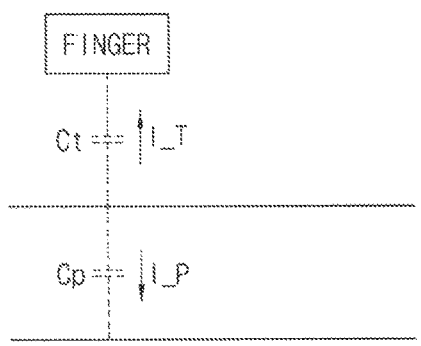
FIG. 4 is a diagram illustrating an example of a touch sensing function of the pixel of FIG. 2.

FIG. 3 is a waveform diagram illustrating an example of signals measured at the pixel of FIG. 2. FIG. 4 is a diagram illustrating an example of a touch sensing function of the pixel of FIG. 2.

Referring to FIGS. 2 and 3, the touch driving signal Vdrv may have a alternative waveform (e.g., a square wave, sine wave), a period of the touch driving signal Vdrv may be less (or shorter) than a light emission period of a pixel 111 (or a refresh period of the data signal DATA, e.g., a horizontal time 1H), and a amplitude of the touch driving signal Vdrv may be less (or smaller) than a voltage level of the first power voltage ELVDD. For example, the light emission period of the pixel 111 is 5.5 milliseconds (ms), and the period of the touch driving signal Vdrv is 0.1 ms. For example, the amplitude of the touch driving signal Vdrv is one tenth (i.e., 1/10) of the first power voltage ELVDD.

The first power voltage ELVDD may be a DC waveform. That is, the first power voltage ELVDD may be a constant voltage.

The third voltage ELVDD_P may have a waveform which is sum of the touch driving signal Vdrv and the first power voltage ELVDD. That is, the third power voltage ELVDD_P may include the first power voltage ELVDD as a DC component and the touch driving signal Vdrv as an AC component.

The touch current I_P flowing through the first capacitor Cp illustrated in FIG. 2 may have an AC waveform corresponding to the AC component of the third power voltage ELVDD_P (e.g., the touch driving signal Vdrv). For example, the touch current I_P may increase or decrease at a transition point of the touch driving signal Vdrv. A period of the touch current I_P may be equal to the period of the touch driving signal Vdrv.

Referring to FIGS. 2 and 4, when a touch input object (e.g., a finger of a user) approaches to the pixel 111 (or, a surface of the display panel 110), a touch capacitance between the touch input object and the pixel 111 may be formed (or generated). For example, the touch capacitance may be represented as a second capacitor Ct corresponding thereto as illustrated in FIG. 4.

Here, because the second capacitor Ct due to the touch input object is formed in parallel to the first capacitor Cp, the total capacitance between the first and second electrodes DE1 and DE2 of the pixel 111 may be equal to a sum of the touch capacitance and the first capacitance. That is, the total capacitance between the first and second electrodes DE1 and DE2 of the pixel 111 may be equal to the first capacitance when no touch input is applied, and the total capacitance between the first and second electrodes DE1 and DE2 of the pixel 111 may be changed to be equal to the sum of the touch capacitance and the first capacitance when a touch input is applied. Therefore, amplitude of the touch current I_P may decrease by the touch input.

For example, a first amplitude of the touch current I_P may be A_Ip1 when no touch input is applied (e.g., at a first point T1 illustrated in FIG. 3), and a second amplitude of the touch current I_P may be A_Ip2 when a touch input is applied (e.g., at a second point T2 illustrated in FIG. 3), where the second amplitude A_Ip2 is less than the first amplitude A_Ip1 by ΔIp.

The display device 100 may sense the touch input based on a change of the total capacitance between the first and second electrodes DE1 and DE2 of the pixel 111. For example, the display device 100 may include a sensor, may sense (or measure) the touch current I_P flowing through the first capacitor Cp, and may sense (or detect) the touch input based on a change of the touch current I_P. The display device 100 may sense the touch input using a touch sensing technique (e.g., a technique to sense a touch input based on a change of capacitance).

As described with reference to FIGS. 2 through 4, the pixel 111 according to example embodiments may have the first capacitance formed between the first and second electrodes DE1 and DE2, may receive the third power voltage ELVDD_P including the touch driving signal Vdrv through the first electrode, and may sense the touch input based on a change of the total capacitance between the first and second electrodes DE1 and DE2 due to the touch input. That is, the display device 100 according to example embodiments may include the pixel 111 in which a touch sensor is included (e.g., a touch sensor in-cell type pixel).

The DC component of the third power voltage ELVDD_P may be changed due to a touch input of the touch input object. For example, the total capacitance between the first and second electrodes DE1 and DE2 of the pixel 111 may be changed according to the touch input, and amplitude of smoothed third power voltage may be different from the first power voltage ELVDD. Thus, the pixel 111 may not emit light with a predetermined luminance corresponding to a data signal. That is, a displaying quality of the pixel 111 may be degraded. However, the display device 100 according to example embodiments may use the degradation of the displaying quality as an alarm function (e.g., a function to inform a user that the touch input is normally applied, e.g., a haptic function). That is, the display device 100 may use a luminance variation (or a color change, a change of the chromaticity coordinate) of the pixel 111 due to the touch input as a function to represent a normal reception of the touch input.

Figure 5:
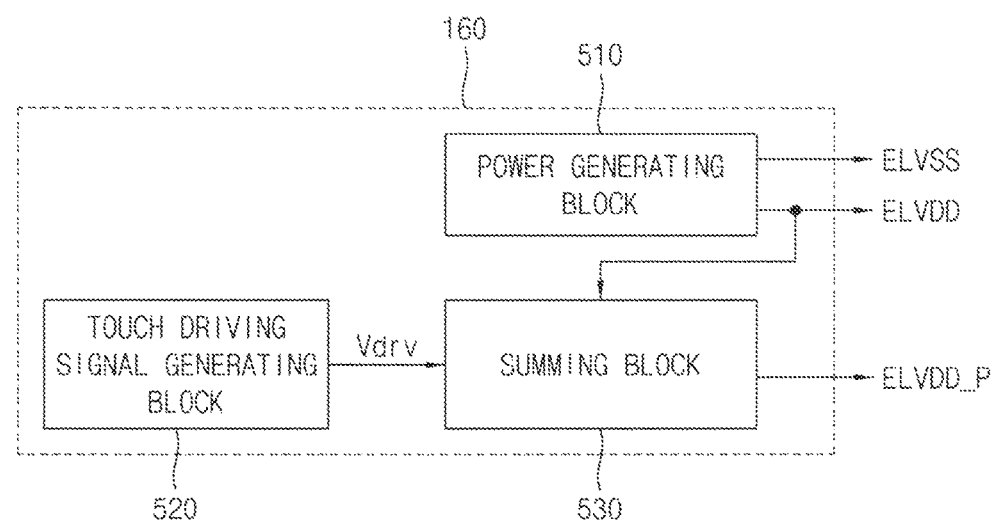
FIG. 5 is a block diagram illustrating a power supply included in the display device of FIG. 1.

FIG. 5 is a block diagram illustrating a power supply included in the display device of FIG. 1.

Referring to FIG. 5, the power supply 160 may include a power generating block 510, a touch driving signal generating block 520, and a summing block 530.

The power generating block 510 may generate the first power voltage ELVDD and the second power voltage ELVSS, respectively. The first power voltage ELVDD may have a first predetermined constant voltage level, the second power voltage ELVSS may have a second predetermined constant voltage level. The second predetermined constant voltage level may be less than the first predetermined constant voltage level. For example, the second predetermined constant voltage level may be a ground voltage level. The power generating block 510 may be implemented as a DC to DC converter (or a DC-DC converter).

The touch driving signal generating block 520 may generate the touch driving signal Vdrv. For example, the touch driving signal generating block 520 may receive a reference clock signal from an external component (e.g., the timing controller 120), may generate phase signals by delaying the reference clock signal by a specific time (or by a multiple of a specific time), and may generate the touch driving signal Vdrv by sequentially outputting the phase signals through one output terminal. It is illustrated in FIG. 5 that the touch driving signal generating block 520 may be included in the power supply 160. However, the touch driving signal generating block 520 is not limited thereto. For example, the touch driving signal generating block 520 may be included in the timing controller 120.

The summing block 530 may sum the first power voltage ELVDD and the touch driving signal Vdrv. For example, the summing block 530 may include a first resistor and a second resistor which are electrically connected in series, the first power voltage ELVDD is applied across the first resistor, the touch driving signal Vdrv is applied across the second resistor, and the summing block 530 may output a voltage across the first and second resistors as the third power voltage ELVDD_P.

As described above, the power supply 160 may generate the third power voltage ELVDD_P including the touch driving signal Vdrv and the first power voltage ELVDD and may supply the third power voltage ELVDD_P to the first electrode DE1 of the pixel 111. The display device 100 may sense a touch input based on the third power voltage ELVDD_P provided to the first electrode DE1 of the pixel 111 and a change of the total capacitance between the first and second electrodes DE1 and DE2 due to the touch input.

Figure 6:
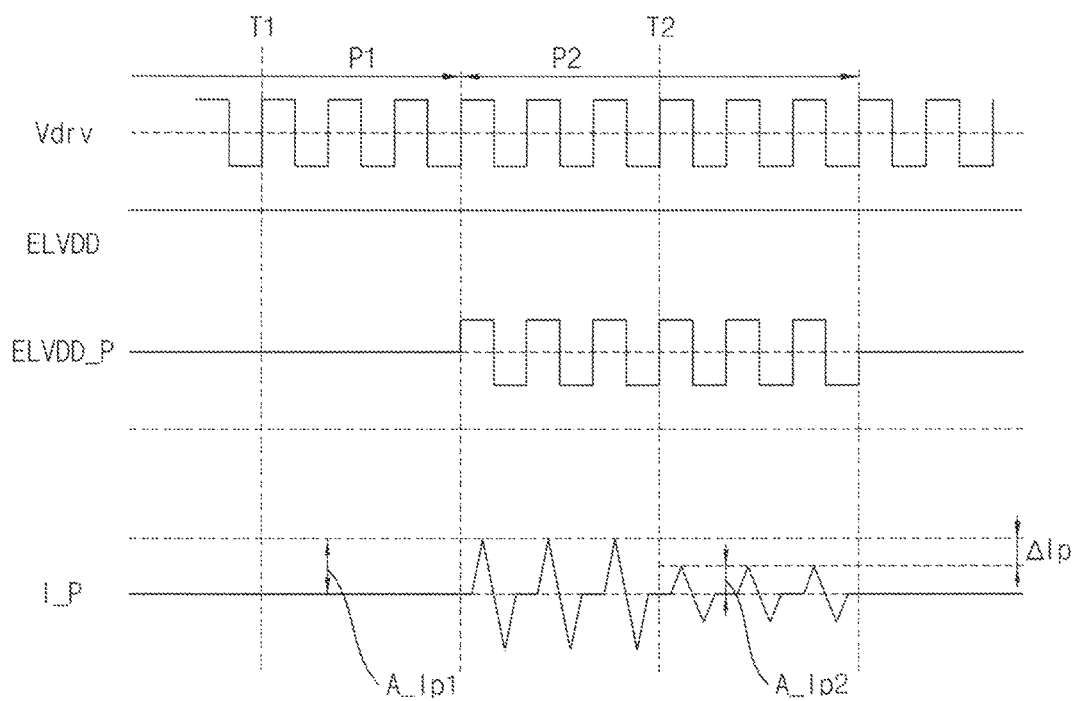
FIG. 6 is a waveform diagram illustrating another example of signals measured at the pixel of FIG. 2.

FIG. 6 is a waveform diagram illustrating another example of signals measured at the pixel of FIG. 2.

Referring to FIGS. 1, 2, and 6, the display device 100 may perform a touch sensing function in a sensing period (e.g., a data writing period) which is independently set.

The power supply 160 may generate the first power voltage ELVDD, the second power voltage ELVSS, and the third power voltage ELVDD_P and may alternately supply the first power voltage ELVDD and the third power voltage ELVDD_P to the first electrode DE1 of the pixel 111 (with a specific time period). Here, the third power voltage ELVDD_P may be the same as or substantially the same as the third power voltage ELVDD_P described with reference to FIG. 3.

As illustrated in FIG. 6, the third power voltage ELVDD_P may have a voltage level which is equal to a voltage level of the first power voltage ELVDD in a first period P1 (or in a light emission period) and may have a waveform of sum of the first power voltage ELVDD and the touch driving signal Vdrv in a second period P2 (or in a data writing period). Here, the pixel 111 may store the data signal DATA into the storage capacitor Cst in the second period P2 and may emit light based on the data signal DATA in the first period P1.

The gate signal GC to control the third transistor M3 illustrated in FIG. 2 may have a logic high level in the first period P1 and may have a logic low level in the second period P2. Here, the third transistor M3 may be turned off in the first period P1 and may block (or disconnect) a flowing path of the driving current Id. The third transistor M3 may be turned on in the second period P2 and may form the flowing path of the driving current Id.

As illustrated in FIG. 6, in the first period P1, the third power voltage ELVDD_P may include only the first power voltage ELVDD. Here, the pixel 111 may emit light based on the first power voltage ELVDD, the second power voltage ELVSS, and the data signal DATA. That is, the pixel 111 may emit light normally without an influence of the touch driving signal Vdrv because the third power voltage ELVDD_P includes no touch signal driving signal.

In the second period P2, the third power voltage ELVDD_P may include the touch driving signal Vdrv. As described with reference to FIG. 3, the display device 100 may perform a touch sensing function based on the touch driving signal Vdrv. The storage capacitor Cst may store the data signal DATA independently to the third power voltage ELVDD_P. Therefore, the third power voltage ELVDD_P (or the touch driving signal Vdrv) may do no effect on the data signal DATA.

When the touch input is applied at a second time point T2, in the same manner as the second time point T2 as described with reference to FIG. 3, the touch current I_P flowing between the first electrode DE1 and the second electrode DE2 (e.g., through the first capacitor Cp illustrated in FIG. 2) based on the touch driving signal Vdrv may be changed from the first amplitude A_Ip1 to the second amplitude A_Ip2. Therefore, the display device 100 may sense the touch input based on a change of the touch current I_P.

As described above, the display device 100 according to example embodiments may use driving electrodes (e.g., the first and second electrodes) of a pixel as a touch sensing electrode and may perform a touch sensing function in a specific period (e.g., a period except a light emission period). Therefore, the display device 100 may correctly emit a light based on the data signal DATA regardless of the touch driving signal Vdrv.

The present inventive concept may be applied to any display device (e.g., an organic light emitting display device, a liquid crystal display device, etc). For example, the present inventive concept may be applied to a television, a computer monitor, a laptop, a digital camera, a cellular phone, a smart phone, a personal digital assistant (PDA), a portable multimedia player (PMP), an MP3 player, a navigation system, a video phone, etc.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A display device comprising:
  a pixel including a first electrode and a second electrode, the pixel having a first capacitor and a light emission element-formed between the first electrode and the second electrode;
  a power supply configured to provide the first electrode with a third power voltage including an alternative wave form and to provide the second electrode with a second power voltage; and
  a sensor configured to sense a touch current flowing between the first electrode and the second electrode in response to the touch driving signal,
  wherein the third power voltage includes a touch driving signal and a first power voltage,
  wherein the first electrode forms touch capacitance between a touch input object and the first electrode,
  wherein the touch input object approaches from an outside of the display device to the first electrode,
  wherein the touch driving signal has a square waveform and amplitude which is less than the first power voltage,
  wherein the first power voltage has a constant voltage level, and
  wherein the third power voltage has a waveform of sum of the first power voltage and the touch driving signal.

2. The display device of claim 1, wherein the third power voltage is smoothed by the first capacitor.

3. The display device of claim 2, wherein the touch current decreases according to an approach of the touch input object.

4. The display device of claim 3, wherein the sensor detects a touch input of the touch input object based on a change of the touch current.

5. The display device of claim 4, wherein the pixel further includes:
  a switching transistor electrically connected between a data line and a third node and transferring a data signal from the data line to the third node in response a scan signal;
  a storage capacitor electrically connected between the third node and a fourth node and storing the data signal, the light emission element being electrically connected between the fourth node and the second electrode; and
  a driving transistor electrically connected between the first electrode and the fourth node and transferring a driving current to the light emission element based on a third voltage at the third node.

6. The display device of claim 5, wherein the pixel further includes:
  a third transistor electrically connected between the first electrode and the switching transistor and forming a flowing path of the driving current in response to a light emission control signal.

7. The display device of claim 1, wherein the third power voltage includes a touch driving signal and a first power voltage, and wherein the power supply includes:
a power voltage generating block which generates the first power voltage and the second power voltage;
a touch driving signal generating block which generates the touch driving signal; and
a summing block which outputs the third power voltage by summing the first power voltage and the touch driving signal.

8. A display device comprising:
a pixel including a first electrode and a second electrode, the pixel having a first capacitor and a light emission element formed between the first electrode and the second electrode;
a power supply configured to generate a first power voltage, a second power voltage, and a third power voltage, to alternately provide the first electrode with the first power voltage and the third power voltage, and to provide the second electrode with the second power voltage, the third power voltage including an alternative wave form; and
a sensor configured to sense a touch current flowing between the first electrode and the second electrode in response to the touch driving signal,
wherein the third power voltage includes the first power voltage and a touch driving signal,
wherein the first electrode forms touch capacitance between a touch input object and the first electrode,
wherein the touch input object approaches from an outside of the display device to the first electrode,
wherein the touch driving signal has a square waveform and amplitude which is less than the first power voltage,
wherein the first power voltage has a constant voltage level, and
wherein the third power voltage has a waveform of sum of the first power voltage and the touch driving signal.

9. The display device of claim 8, wherein the touch current decreases according to an approach of the touch input object.

10. The display device of claim 9, wherein the sensor detects a touch input of the touch input object based on a change of the touch current.

11. The display device of claim 10, wherein the pixel further includes:
a switching transistor electrically connected between a data line and a third node and transferring a data signal from the data line to the third node in response a scan signal;
a storage capacitor electrically connected between the third node and a fourth node and storing the data signal, the light emission element being electrically connected between the fourth node and the second electrode; and
a driving transistor electrically connected between the first electrode and the fourth node and transferring a driving current to the light emission element based on a third voltage at the third node.

12. The display device of claim 11, wherein the pixel further includes:
a third transistor electrically connected between the first electrode and the switching transistor and forming a flowing path of the driving current in response to a light emission control signal.

13. The display device of claim 12, wherein the power supply provides the third power voltage to the first electrode in a data writing period and provides the first power voltage to the first electrode in a light emission period, and
wherein the pixel stores the data signal in the data writing period and emits light based on the data signal in the light emission period.

14. The display device of claim 8, wherein the third power voltage includes the first power voltage and a touch driving signal, and
wherein the power supply includes:
a power voltage generating block which generates the first power voltage and the second power voltage;
a touch driving signal generating block which generates the touch driving signal; and
a summing block which outputs the third power voltage by summing the first power voltage and the touch driving signal.

* * * * *